(12) United States Patent
Katyl et al.

(10) Patent No.: US 6,181,086 B1
(45) Date of Patent: Jan. 30, 2001

(54) ELECTRONIC BALLAST WITH EMBEDDED NETWORK MICRO-CONTROLLER

(75) Inventors: Robert H. Katyl, Vestal; Robert M. Murcko, Binghamton; David W. Dranchak, Endwell; James R. Petrozello, Endicott, all of NY (US)

(73) Assignee: Jrs Technology Inc., Endicott, NY (US)

( * ) Notice: Under 35 U.S.C. 154(b), the term of this patent shall be extended for 0 days.

(21) Appl. No.: 09/067,352

(22) Filed: Apr. 27, 1998

(51) Int. Cl.⁷ .............................. H02B 37/02; G05F 1/00
(52) U.S. Cl. ................................ 315/307; 315/DIG. 7; 315/316; 315/324; 315/291
(58) Field of Search ................... 315/307, 291, 315/DIG. 7, 292, 316, 324

(56) References Cited

U.S. PATENT DOCUMENTS

| | | |
|---|---|---|
| 3,697,821 | 10/1972 | Johnson . |
| 4,733,138 | 3/1988 | Pearlman .............................. 315/307 |
| 4,950,959 | * 8/1990 | Beckrot et al. ...................... 315/11.7 |
| 5,030,887 | * 7/1991 | Guisinger ......................... 315/DIG. 4 |
| 5,315,214 | 5/1994 | Lesea ................................ 315/209 R |
| 5,381,078 | * 1/1995 | Szuba .................................... 315/324 |

OTHER PUBLICATIONS

Philips Lighting "IFS Lighting Control System Overview" Sep. 1990.*
Epperson "A Digital Lighting System for the Theatre" (sic) May 1974.*

* cited by examiner

Primary Examiner—Michael B Shingleton
(74) Attorney, Agent, or Firm—Salzman & Levy

(57) ABSTRACT

The present invention features an electronic ballast for use with gas discharge lamps incorporating a microprocessor-based network controller which facilitates the direct attachment of the ballast to a local or building-wide energy management systems. The use of the inventive ballast allows the production of a lighting luminaire whose light output, power consumption, and other operational or environmental parameters can be monitored and controlled as part of the distributed building control network. A building control computer network can control lighting functions, such as power on/off and dimming. The ballast of the present invention includes provision allowing connection to a local utility so that lighting in large buildings can be cut back in times of high power demand to help balance system loading.

31 Claims, 18 Drawing Sheets

CB1 Ballast

ELECTRONIC BALLAST WITH EMBEDDED NETWORK MICRO-CONTROLLER

FIELD OF THE INVENTION

The present inventions relates to a system for computerized energy management, more particularly to an apparatus for controlling lighting luminaries whose light output, power consumption, and parameters can be monitored and controlled as part of the distributed building control network.

BACKGROUND OF THE INVENTION

In the field of computerized energy management in large buildings energy conservation is very important. The systems used presently utilize a distributed computing approach to control heating, ventilation and some lighting management. In addition, some systems may incorporate miscellaneous functions such as security monitoring and control, and fire and burglar alarm management. In many buildings, control and monitoring are performed by a centralized computer connected to the network. The central computer may actually reside in a remotely located building and communicate via telephone, satellite, or other means. The connections within the network itself may include multiple media, including a twisted pair or coaxial wiring, power line signaling, fiber-optic cabling and rf links. Networks of this type do not necessarily need a centralized control computer to coordinate activities.

It is possible to organize a network so that it serves as a means for communication between micro-controllers distributed throughout the building. In this approach their actions are coordinated by their internal control programs. An example of this would be a case whereby a switch closure signal sent to one luminaire to energize its lamps is then relayed by its micro-controller over the network to a number of other luminaries to energize them as well. This discussion assumes that a central computer performs the principal control and monitoring functions of a energy management system.

The state of the art micro-controllers networks being used are LonWorks®, and CEbus®. The micro-controller devices are embedded within the equipment being controlled and is distributed across a building on a network that may consist of different topologies including a star, ring and point to point topologies. The prior art as described in U.S. Pat. No. 5,381,078 entitled "Control and Communication Processor Potentiometer System for Controlling Fluorescent Lamps", is one such control system. This control system uses a distributed LonWorks® micro-controllers containing electronic potentiometers mounted on a wall and lighting controllers mounted on ceiling to set the dimming level of a number of dimmable slave ballasts under its control. However, the control system does not sense ballast parameters.

The following is a discussion of the dimming ballast circuitry, its means of dimming control, and its interface to the embedded micro-controller. The discussion centers around a design that uses the ML4832 integrated circuit (IC) ballast controller chip made by MicroLinear, 2092 Concourse Drive, San Jose, Calif. 95131. This IC is similar to that described in U.S. Pat. No. 5,315,214, entitled "Dimmable High Power Factor High-Efficiency Electronic Ballast Controller Integrated Circuit with Automatic Over-Temperature Shutdown", by Lesea, dated May 24, 1994. This IC combines power factor correction functions and ballast control in one IC. Approaches using other IC devices should be obvious to those skilled in the art. Sectioned schematic diagrams will be shown for clarity is describing the essential points of the invention, the details not explained can be found by referencing the MicroLinear literature.

Next, the system for dimming a fluorescent light is described in U.S. Pat. No. 3,697,821. In the aforementioned patent, a semiconductor multiple remote control unit have been used to switch and dim lights. A remote control unit is provided for individually and independently controlling the brightness of the lamps independently controlling the operation of a common lamp dimmer unit by turning on and off the dimmer unit and controlling the brightness of the lamps independently of previous settings or condition of the remote control units. A three wire conductor system is used to connect the various remote control units that are in parallel to one another.

The next prior art invention relates to controlling a household lighting circuit, U.S. Pat. No. 4,733,138. The aforementioned patent is a programmable lighting circuit controller for controlling a plurality of household lighting circuits. The invention includes a microprocessor and an electronically erasable programmable read-only memory for programming household lighting circuits for a variety of loads. One of the lighting circuits may include fluorescent loads by using a heater circuit for the fluorescent lamps. The microprocessor is controlled to raise and lower lighting levels, set lighting levels in memory and recall preset levels from memory, as well as to provide heating for fluorescent lights.

The prior art inventions are all related to controlling the light by either electronic potentiometers, semiconductors or a microprocessor with an erasable read only memory. However, the prior art does not use the lighting circuitry to control the energy management in large buildings.

It is an object of this invention to provide an electronic lighting ballast that contains an interfacing means of connecting the ballast to a building computer network for the purposes of ballast control, ballast and luminaire monitoring of light output, energy usage, lamp current, and ballast temperature, environmental monitoring including nearby light levels, and room temperature, and control and monitoring of other nearby luminaries. Such a network can be interconnected to local utility companies so that lighting in large buildings can be selectively managed in times of high power demand to help balance system loading.

It would be advantageous to provide an electronic lighting ballast that contains a computer interface incorporating a micro-controller system to provide control and monitoring functions under operation of a program stored in its own computer memory.

It would also be advantageous to provide an electronic lighting ballast that contains within it means of powering said computer interface and micro-controller circuitry.

It would also be advantageous to provide an electronic lighting ballast that contains means for connection of light detection sensors, occupancy sensors, temperature sensors, and other environmental sensors that are located remote from the luminaire.

It would also be advantageous to provide an electronic lighting ballast that contains means for controlling and monitoring other nearby incandescent or gas discharge lighting luminaries, such means include control by means of the micro-controller contained within the luminaire, or control by commands obtained from the energy management control network.

It would also be advantageous to provide an electronic lighting ballast that contains means of identification to the control computer network, and means of identifying each luminaire under its control to the energy management control network.

It would also be advantageous to provide an electronic lighting ballast that contains within it means of modulating light for communication purposes, with data to be communicated being obtained from the distributed building control network through a computer interface means contained within the ballast unit.

It would also be advantageous to provide an electronic lighting ballast that has the above control, and monitoring features, but the computer interfacing and micro-controller circuitry is located nearby the luminaire so that it contains its identity to the building computer network.

SUMMARY OF THE INVENTION

The present invention is motivated by the fact that the systems being used now does not have an energy management system that produces a lighting luminaire whose light output, power consumption, and parameters can be monitored and controlled as part of the distributed building control network. The present invention uses control networks that can be connected to the local utility so that lighting in large buildings can be cut back in times of high power demand to help balance system loading. A key part of the present invention is an electronic lighting ballast that can be connected to the network. The unit would permit control of many fluorescent and gas discharge lighting fixtures within a large building and would allow more effective management of lighting energy usage. In addition, from a system maintenance viewpoint, functions such as lamp or ballast replacement could be more effectively managed. Further, as lamps age the maintenance of lumen output could be tracked on a continual basis throughout a building.

The present invention describes an electronic ballast for powering fluorescent or other gas discharge lighting lamps that contains special circuitry that allows connection to be distributed to a building control computer network for the purposes of controlling lighting functions, such as power on/off, dimming control, and the number of lamps connected to an individual ballast, and monitoring ballast parameters such as lamp light output, lamp current, ballast power consumption, ballast temperature, as well as room environmental conditions. If the special circuitry includes a small micro-controller unit, the ballast would be able to perform control and monitor functions by means of a program stored within its own micro-controller memory, such functions may be coordinated from the building control network. Other capabilities include monitoring of ballast operation, sensing of light levels within and/or outside of the fixture, and sensing of other environmental parameters such as the output of motion detectors that sense room occupancy, room temperature and humidity. Still other capabilities include control of other ballasts in nearby luminaries, and control of other lighting luminaries that may contain standard incandescent lighting, and connection of other room monitoring sensors located remotely from the luminaire. Still other capabilities include transmission of data over a communication channel formed by modulation of the luminaire output as by various methods of including amplitude, frequency or phase modulation means within the ballast, with the data source being part of the distributed building computer network. Ballasts with information transmission means are discussed in co-pending patent application "Fluorescent Light Ballast with Information Transmission Circuitry", by Katyl and Murcko, file number 08632297, docket H-322.

Another desirable feature in an electronic ballast is local control capability which would allow it to turn on or off or set a dimming level according to control instructions contained within its own micro-controller memory. The micro-controller within the ballast would be linked to the building control micro-controller and could be re-programmed through it. With additional interfacing capability, other nearby ballasts that have the proper circuitry installed could also be controlled by the control ballast that is connected to the building network.

BRIEF DESCRIPTION OF THE DRAWINGS

A complete understanding of the present invention may be obtained by reference to the accompanying diagrams, when taken in conjunction with the detailed description thereof and which.

DESCRIPTION OF THE PREFERRED EMBODIMENT

Referring now to the various figures of the drawings, a preferred embodiment of the present invention shall be described in detail. Like numerals shall refer to like parts.

Figure 1:
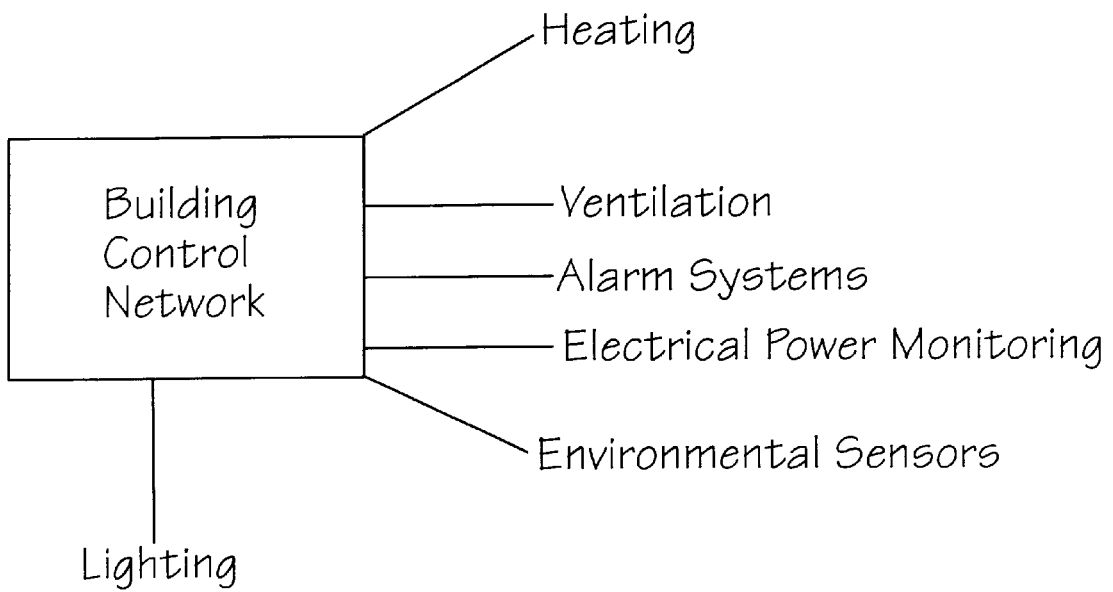
FIG. 1 is a block diagram representation of a building control network.

Referring now to FIG. 1, A block diagram of a building control network using this type of ballast and its specialized circuitry is shown. A network of wiring and interconnections within the building connects various pieces of equipment to the control computer. Items that are typically connected include the heating and ventilation equipment, burglar and fire alarm systems, electrical power monitoring, lighting and environmental sensors.

Figure 2A:
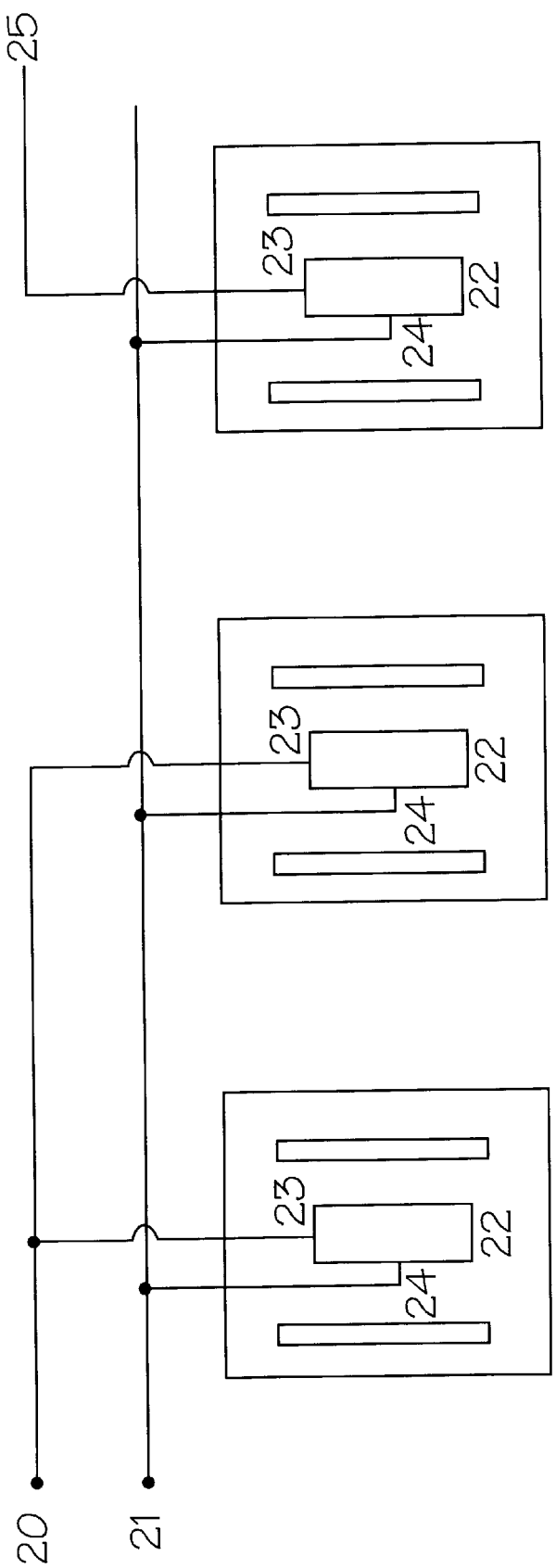
FIGS. 2A, 2B, and 2C are different depictions of ballasts located inside of FIG. 1.

Referring now to FIG. 2A, a detailed view of arrangements of lighting fixtures each containing a control ballast. A wiring arrangement is used in this figure where each luminaire contains at least one ballast with a self-contained interface and control unit, the ballast used is of type CB1. AC power buses 20 and 25 bring power into the luminaries from different ac circuits. The low voltage signal bus 21 provides means for sending control and data communication signals back and forth between the controlling computer and the ballasts. Port 23 is a power entry port on a ballast, and port 24 is a control signal entry port.

Figure 2B:
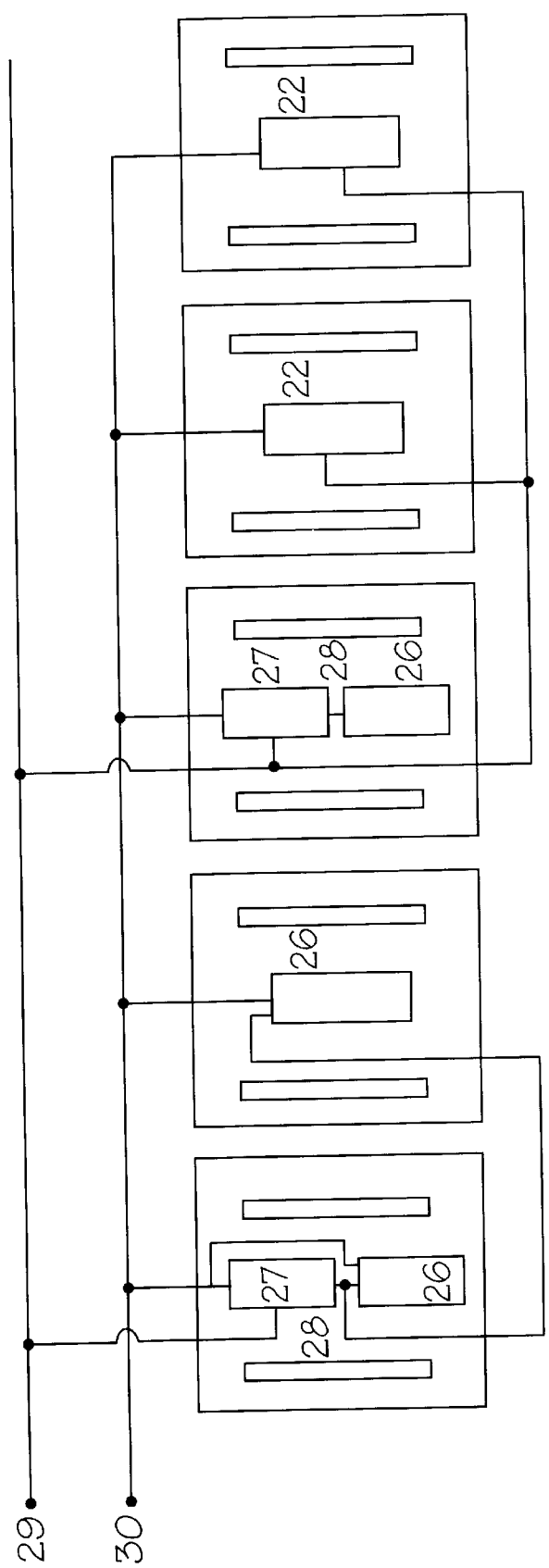

Referring now to FIG. 2b, shows a wiring arrangement that contains some ballasts, 26, that are controlled by a separate interface and control unit, 27. The arrangement also contains ballasts of type CB1 22 that have self contained interface and control capability. Ballasts, 26, lack the microcontroller interface, but have signal entry ports, 28, that allow control and readout of ballast operation. Ballasts of this kind will be termed as being of type CB2. Also shown in FIG. 2b are two ballast 22 of type CB1 that are connected on the same control bus 29 as the control unit 27. AC power is distributed from lines 30, these may be broken into a plurality of circuits, as was done in FIG. 2a.

Figure 2C:
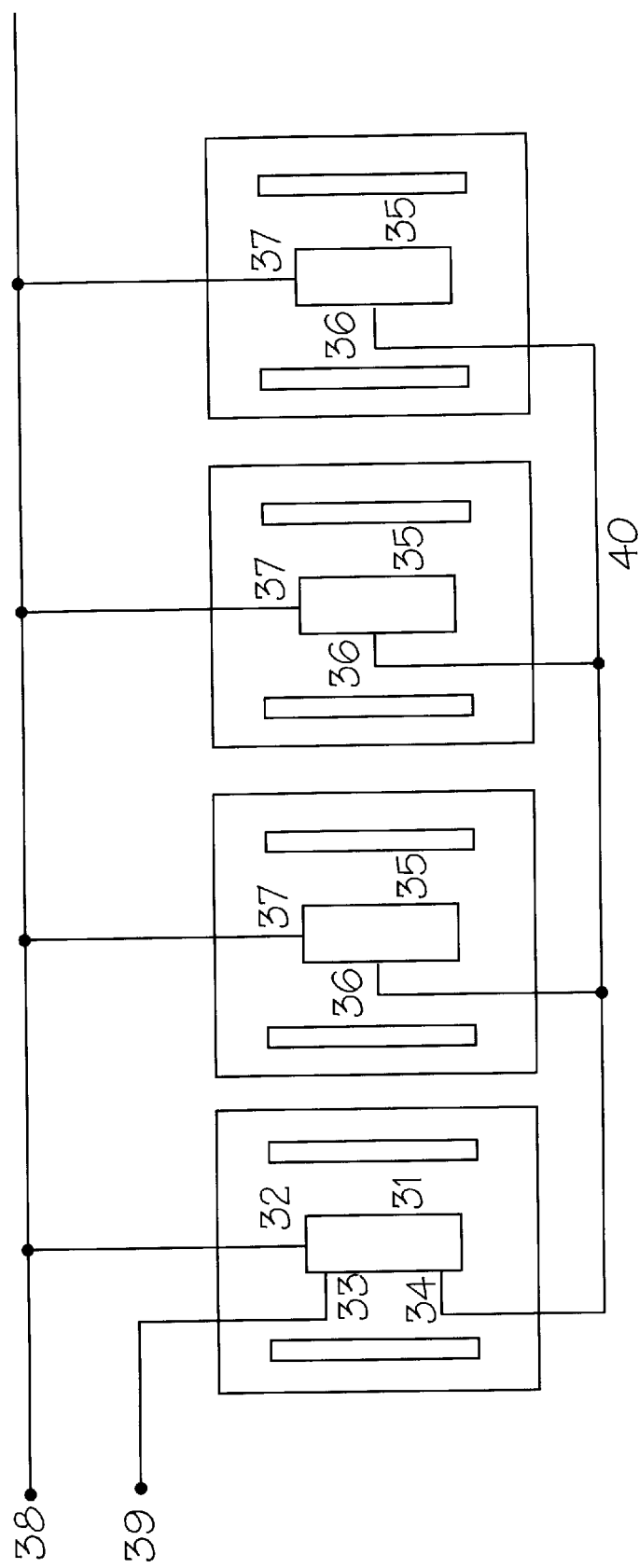

Referring now to FIG. 2C, shows an arrangement in which a ballast 31 communicates with the control network over bus 39, and contains capability within it to produce and receive signals from a network of ballasts 35 and thus provide a capability of distributing the control means across the network to a number of controlling ballasts 31. Ballasts 31 of this kind that have onboard programmable control and detection features will be termed as being of type CB3, while those ballasts that can be controlled and monitored by it are type CB1. Signals from the control network bus 39 are received by the CB3 ballast 31 on port 33. It communicates to ballasts under its control through port 34 which is connected to local communication bus 40. AC power is distributed from lines 38, these may be broken into a plurality of circuits, as was done in FIG. 2a.

Figure 3:
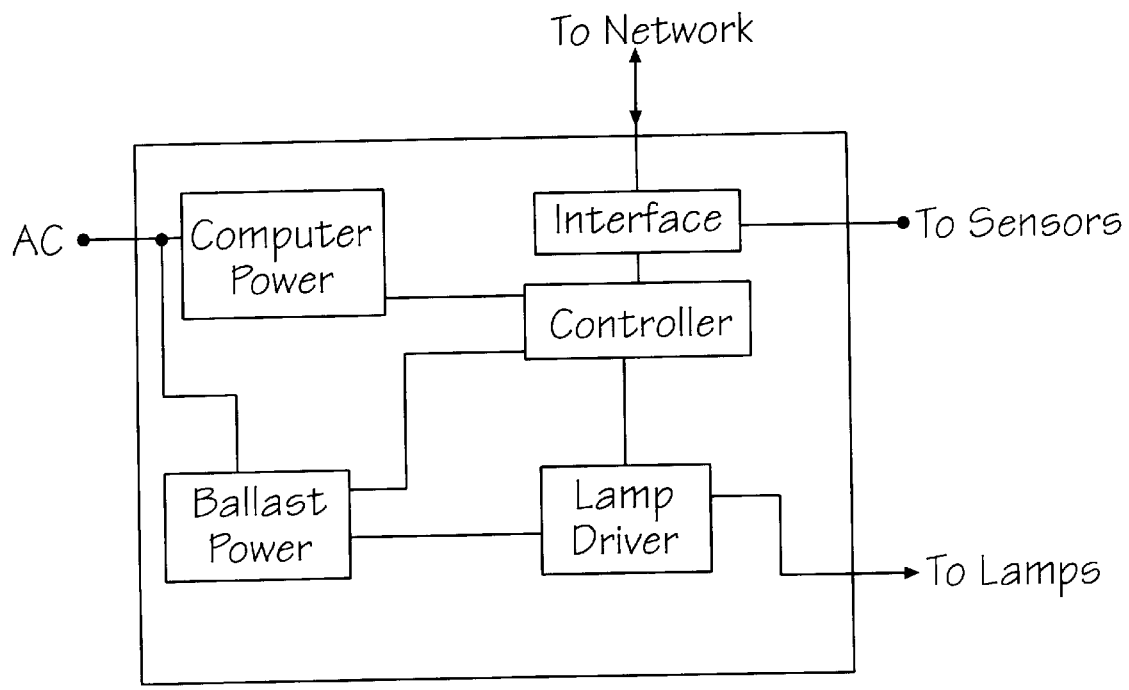
FIG. 3 illustrate a circuit diagram of a ballast.

Referring now to FIG. 3, shows a block diagram of the electronics of ballast of type CB1. This ballast contains the standard power and lamp driving electronics, but also contains within it means for connecting to the control network bus to obtain and send controlling data information. The interface and controller within the ballast also contains means for obtaining their power voltages separate from those used for the lamp driving means. Connection means are also provided for sensor inputs and outputs. The ballast electronics also has within it means for control functions such as lamp dimming, power on/off, power consumption, and lamp current.

Figure 4:
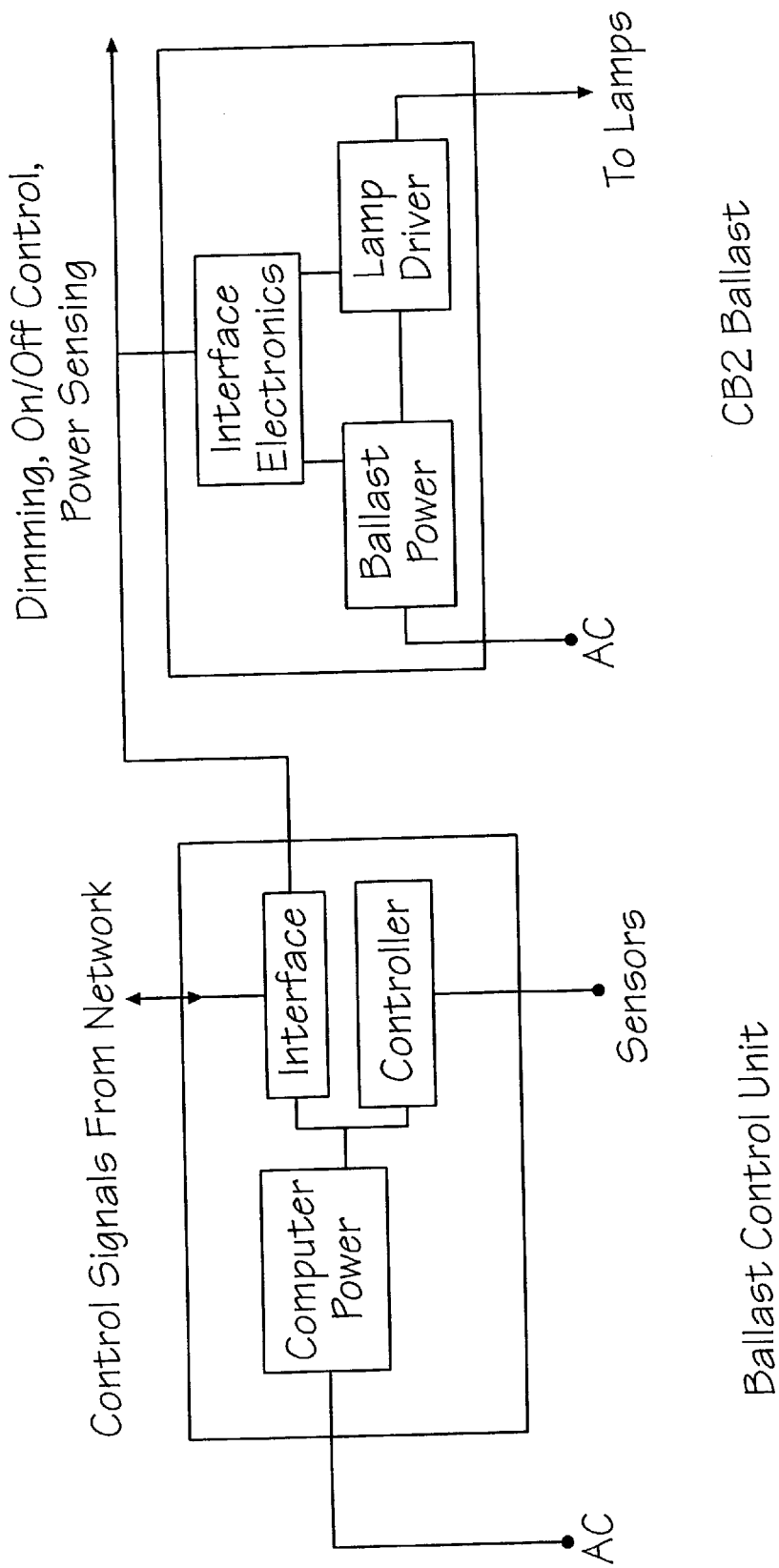
FIG. 4 is a block diagram representation of a controllable ballast of type CB2.

Referring now to FIG. 4, a block diagram of the electronics of ballast of type CB2, as well as its separate controlling unit. In this arrangement, the computer interface, micro-controller power, and sensor connections are connected and located in a separate unit, physically separated from the ballast unit. The control signals from the network connected to the interface is also connected to the interface electronics. The CB2 ballast unit contains the interface electronics connected to the connected to the lamp driving systems connected to the ballast power in a separate unit. The ballast power is connected to an AC power supply and connected to a DC power supply connected to computer power outside of the unit. Further, the lamp driver is connected to lamps outside of the units.

Figure 5:
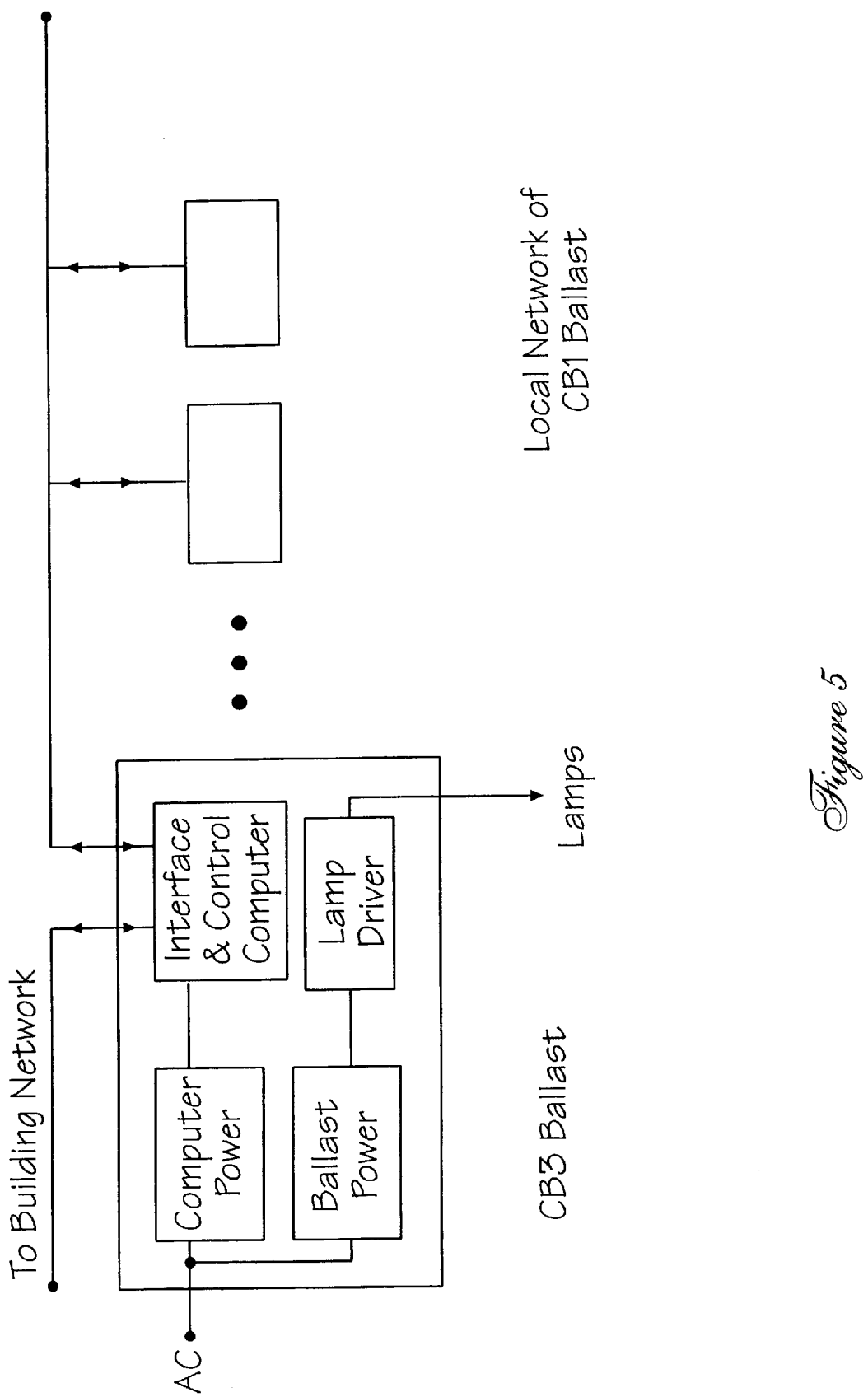
FIG. 5 is a block diagram representation of a controllable ballast of type CB3.

Referring now to FIG. 5, is a block diagram of a CB3 ballast which is similar in architecture to the CB1 unit of FIG. 3. The CB3 unit contains, in addition, means for establishing a local control bus on which a number of CB1 ballasts can be connected. This means includes the stored program capability necessary so that the CB3 ballast can control its slaved CB1 ballasts independent of commands from the building network. This block diagram depicts a building network connected to an interface and control computer connected to computer power which is connected to ballast power connected to a lamp driver in the CB3 ballast unit. The ballast power is connected to AC outside of the CB3 ballast unit. The lamp driver is connected to lamps outside of the CB3 ballast unit.

Figure 6:
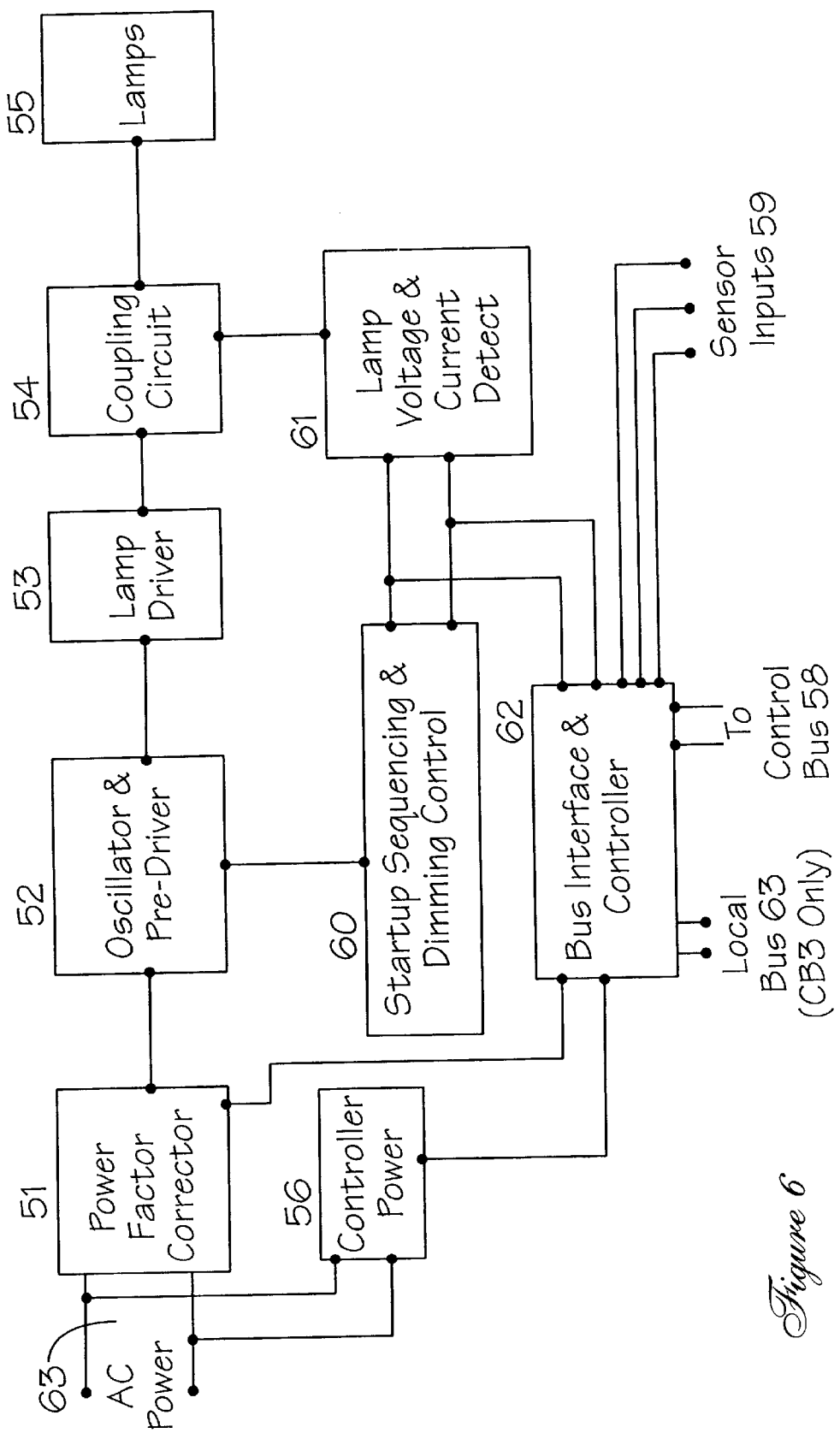
FIG. 6 is a block diagram representation of a ballast of type CB1.

Referring to FIG. 6, which depicts a block diagram of a ballast of type CB1 that can communicate via digital signals over the building network bus 58. This unit contains ballast power electronics 51–55 to provide efficient power conversion for lighting. AC power 63 enters and the converted high frequency current is applied to the lamps 55. Control of starting sequencing and dimming signals 60 receives feedback signals on the current drawn by the lamps and their voltages 62, also dimming control functions are applied from the bus interface and controller 57. Bus interface and controller 57 receive low voltage power from separate power unit 56 that produces low voltage for the bus interface and controller 57 even if the ballast unit is in the power off state. The controller can sense lamp power consumption through signals 62 which are proportional to lamp current and voltage. Alternatively, ac power consumption can be sensed from the ac voltage and current by means well known within the art. External connection 59 allow connection of a variety of external sensors including ambient light level monitors, temperature sensors, and motion detectors. The bus interface and controller 57 can also provide a means for data signals to be sent to the oscillator and pre-driver 52 so that data signals can be modulated onto the emitted light from the luminaire by amplitude, frequency, or phase modulation means. Ballasts of type CB3 are similar in structure but also contain additional circuitry that permits connection to a local network bus through local bus 63. The local bus 63 is not included in CB1 ballasts. With local bus 63 and additional controlling electronics and onboard microcontroller software instructions, ballasts of type CB3 can control a local network of CB1 ballasts using program instructions contained within its own memory unit.

Figure 7:
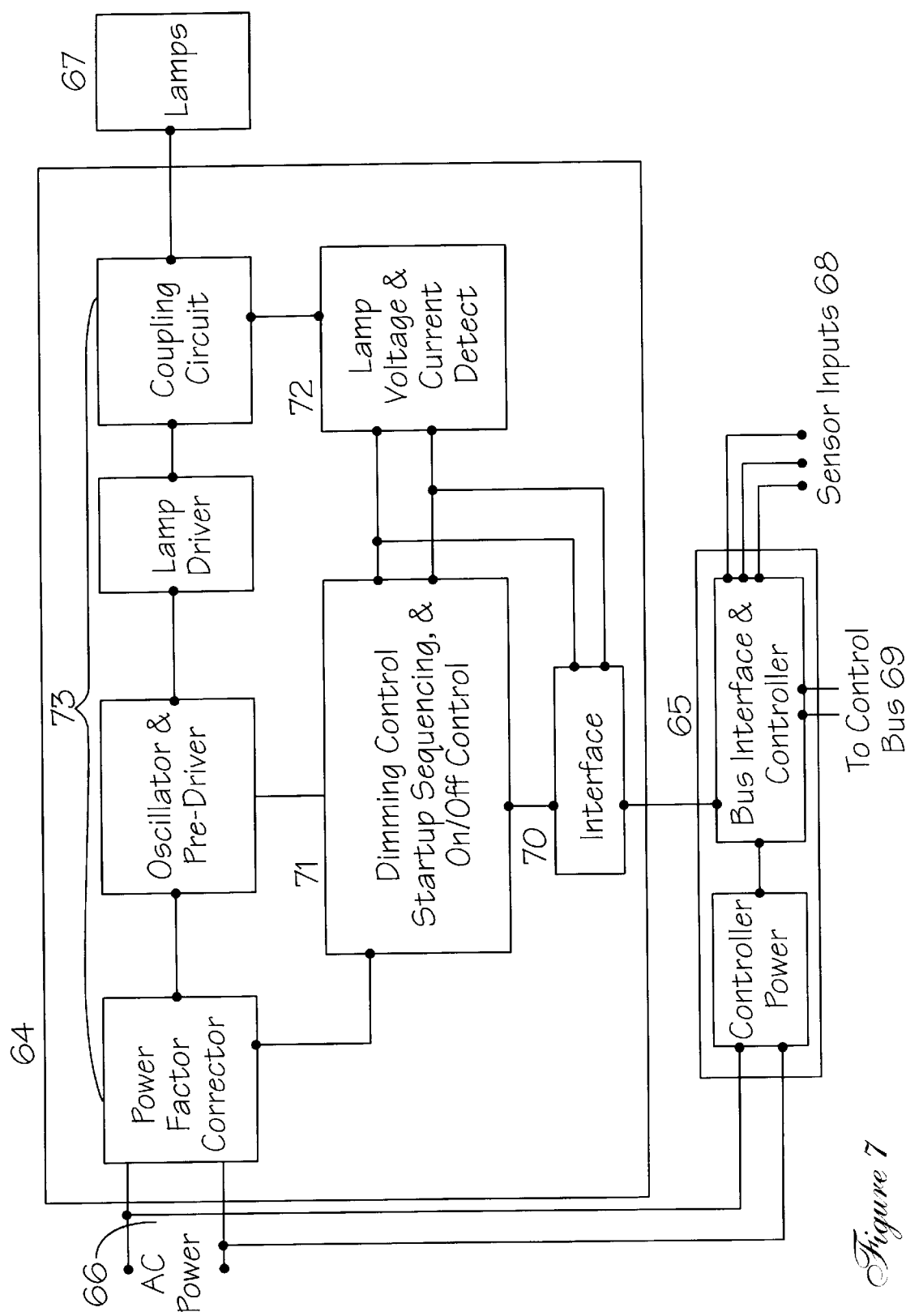
FIG. 7 is a block diagram of a ballast type CB2.

Referring now to FIG. 7, depicts a block diagram showing a ballast 64 of type CB2 along with its accompanying control unit 65 that is located in a separate assembly 65 and lamps are connected to a coupling circuit in 73. AC power 66 is converted to high frequency ac current to drive the lamps using ballast power electronics 73. The power factor correct in ballast power electronics is connected to the controller power of control unit 65. Internal ballast signals for dimming control, startup sequencing, and power on/off control are brought to a set of interface electronics 70 which serves as a communicating medium a to the control unit 65. Also brought to the interface electronics 70 are lamp voltage and current signals from the detection electronics 72 so that these parameters can be periodically sent to the building central computer connected to port 69. External sensor inputs 68 are brought into the circuit.

Figure 8:
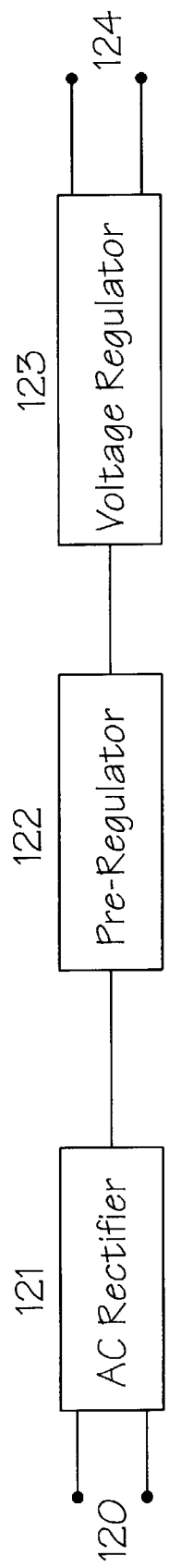
FIG. 8 is a block diagram representation of a power supply circuit.
Figure 10:
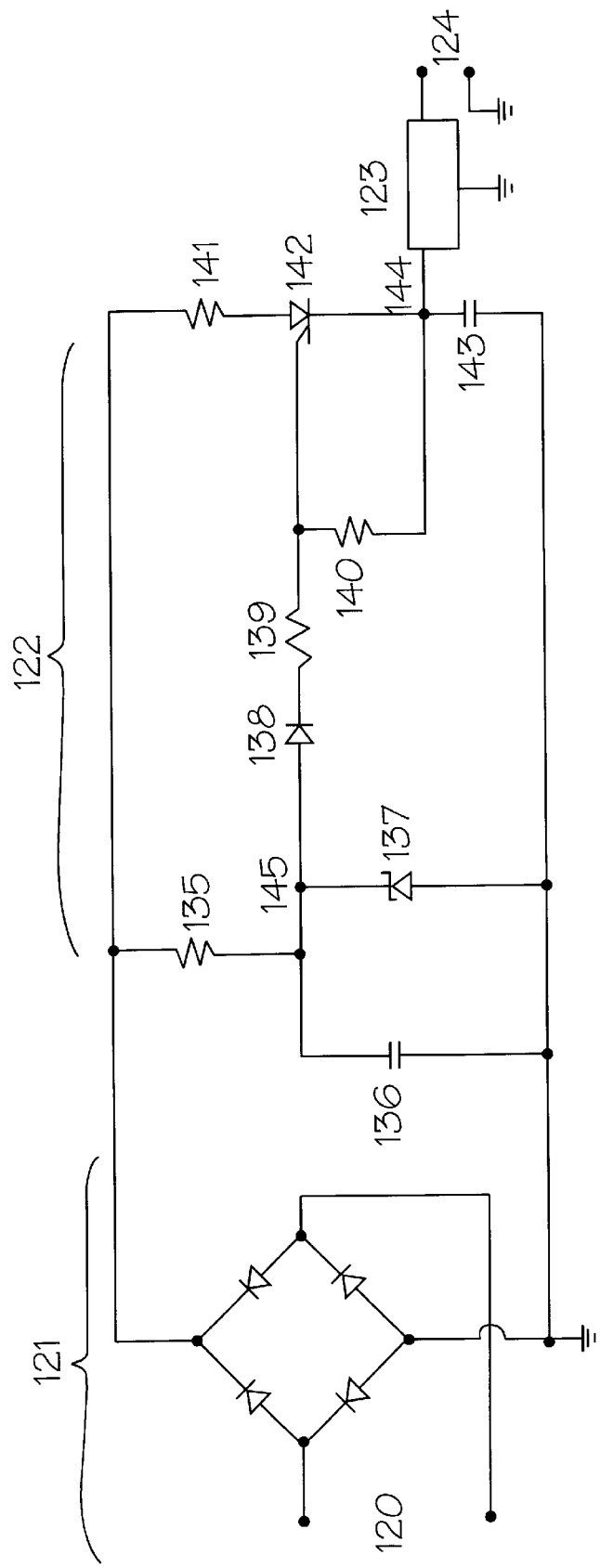
FIG. 10 shows a low voltage supply circuit.
Figure 11:
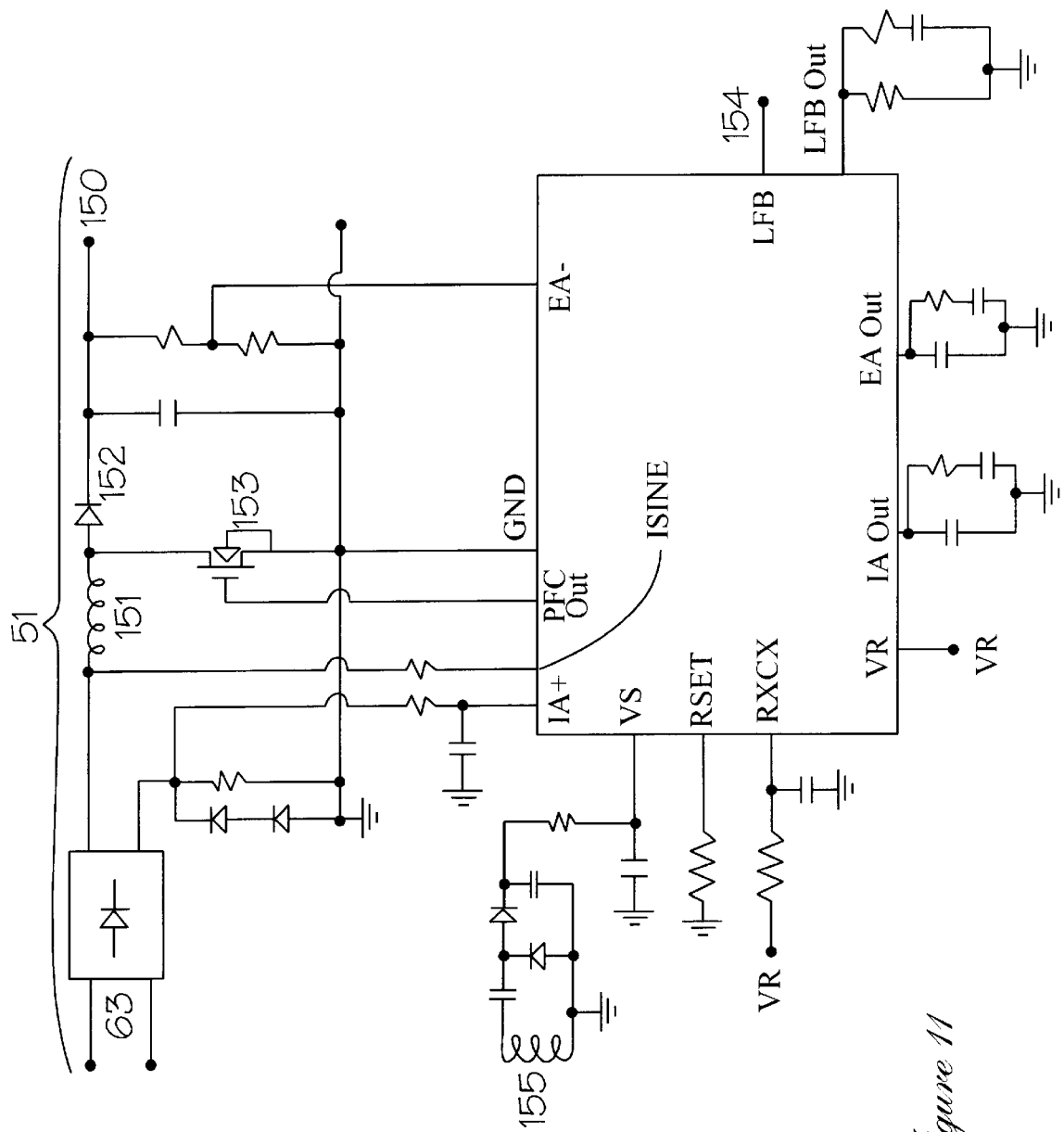
FIG. 11 illustrates the power factor section of the circuit.

Referring now to FIG. 8 shows a block diagram of a power supply circuit that is used to provide low voltage power 124 to the controller circuitry. In the ballast application, ac power 120 is obtained within the ballast and converted to low voltage power separately from the ballast power circuitry. The power circuit consists of a standard ac rectifier 121, connected to voltage regulator 123 having an output of 124. FIG. 10 shows a detailed schematic of one possible implementation based on switching bipolar transistors. FIG. 11 shows another implementation that uses a thyristor device.

Figure 9:
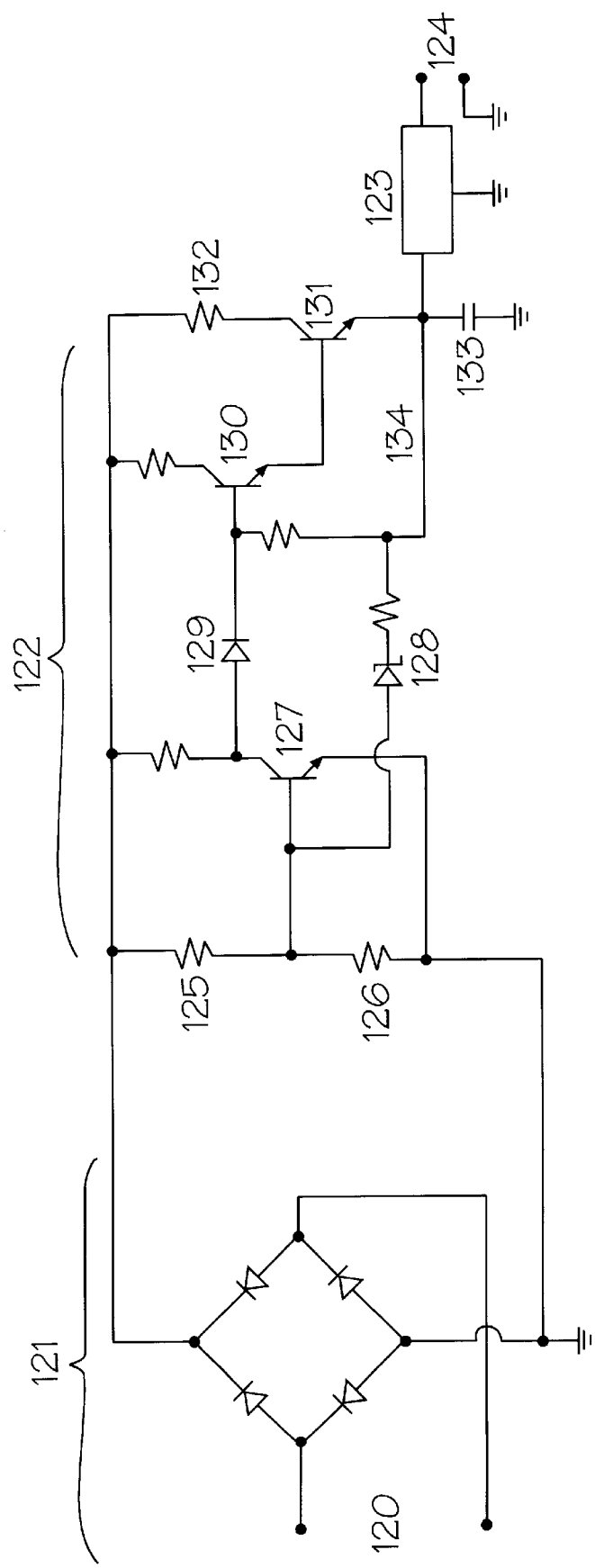
FIG. 9 illustrates is a filtered D.C. from ballast.

Referring now to FIG. 9, depicts a filtered D.C. from the ballast. The filtered D.C. from the ballast is applied to the resistor 125 and capacitor 126. Voltage builds up on capacitor 126 until zener diode 127 breaks down and discharges capacitor 126 through the base of transistor 132. Resistor 128 and capacitor 129 constitute a speed up circuit used to enhance the turn on time transistor 132. The current begins to flow through transformer 133 building up a magnetic field in transformer 133. Resistor 131 and transistor 130 acts to limit current so that transformer 133 does not saturate. When capacitor 126 is discharged, transistor 132 turns off and the magnetic field in transformer 133 collapses. The collapse induces a voltage in the secondary of transformer 133 with such a polarity that diode 134 conducts charging capacitor 135. The zener diode 136 limits the maximum voltage across capacitor 135 to a value several volts greater than the desired output voltage. The low dropout regulator 123 limits the voltage to five volts 124. The aforementioned voltage is the required voltage for the micro-controller neuron chip.

Referring now to FIG. 10, a low voltage supply circuit. This circuit uses SCR device 142 as a switch to permit current pulses through current limiting resistor 141 from the rectified supply 121 to charge pre-regulator capacitor 143. A reference voltage is set at connection 145 by zener diode 137, filter capacitor 136, and resistor 135. If the pre-regulator output 144 falls too low, current flows through diode 138, and resistor 139 and resistor 140 switching on SCR 142 which remains on until the voltage from rectified supply 121 undergoes a zero crossing. The current from SCR 142 charges pre-regulator capacitor 143. This process continues until the voltage at pre-regulator output 144 is sufficiently high so that the SCR 142 does not trigger on and remains off. This circuit has the advantage of fewer parts than that of FIG. 11, but conduction occurs over a larger portion of the power cycle and power dissipation in resistor 141 may be higher than that of transistor 132.

Referring now to FIG. 11, depicts the power factor correction section 51 of the circuit. This circuit is a standard continuous boost topology power factor corrector, utilizing boost inductor 151, boost diode 152, and switching MOSFET 153 to produce boosted dc output 150. Winding 155 of inductor 151 provides power to operate the IC after startup. The full wave charge pump supply is an important addition to the circuit of a dimming ballast, as it supplies adequate power vs to the IC, even at low dimming levels. The connections to the IC 154 relevant for power factor correction are shown in FIG. 11. IA+ and IAOUT are the sense input and compensation port for the ac current sensing function. PFCout provides the gate drive to the MOSFET, and the dc output voltage level is sensed and compensated with ports EA+ and Eaout. Input RSET sets a reference current level within the chip, and RXCX sets startup timing. LFB and LFBout are inputs and outputs of the operational amplifier used to control oscillator frequency.

Figure 12:
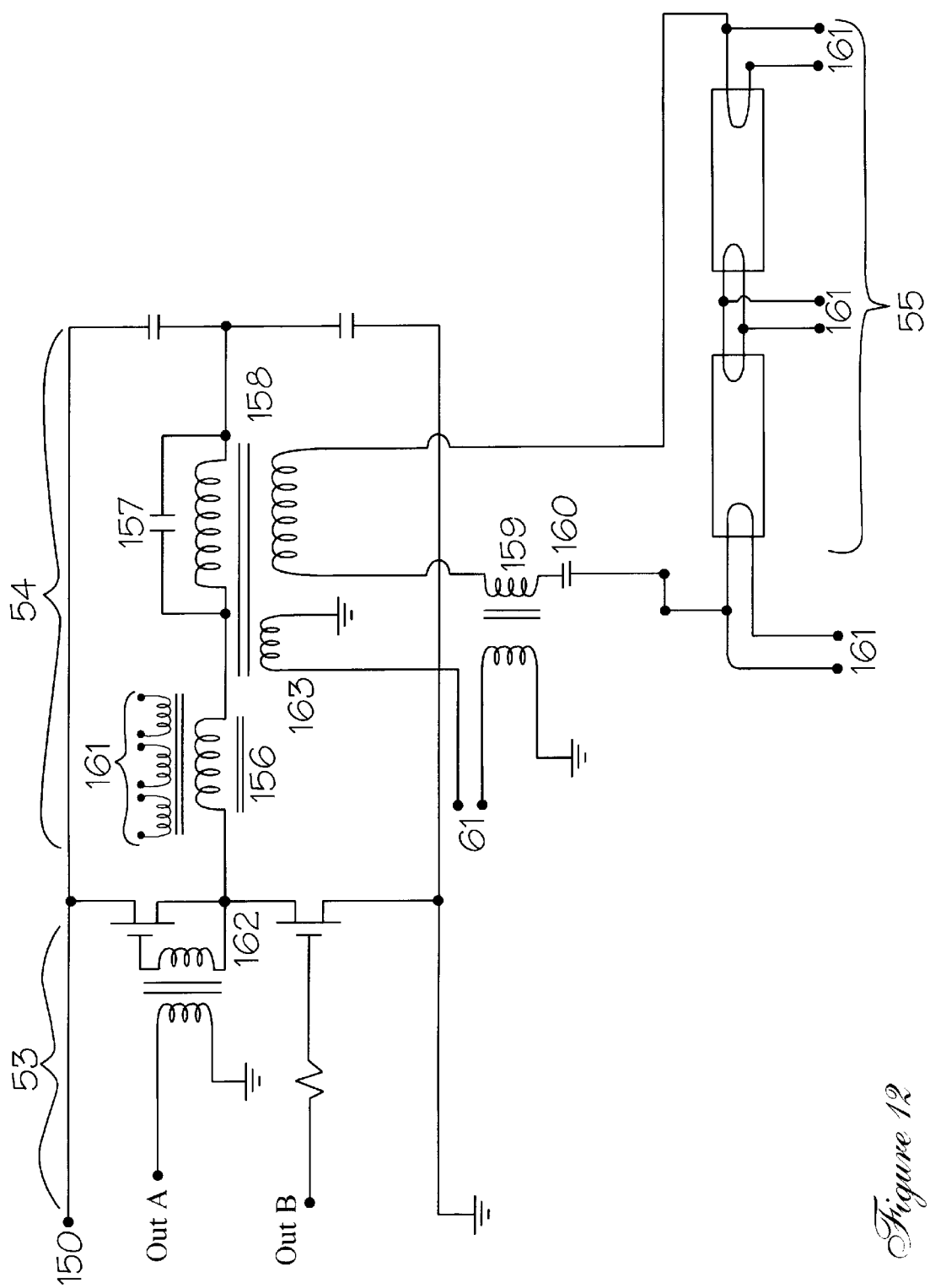
FIG. 12 illustrates the lamp circuitry.

Referring now to FIG. 12, shows the lamp driver 53, coupling circuit 54, and lamp circuitry 55. This circuit is a standard voltage fed series resonant half bridge. DC power 150 is applied to the series MOSFETs that are driven by IC signals OUTA and OUTB. A square voltage waveform at node 162 drives current through the series resonant circuit, inductor 156 and capacitor 157 form the primary resonance. Transformer 158 couples the voltage across capacitor 157 onto the lamp network, and serves the purpose of isolating the lamp network from the ac line connected ballast circuitry for safety purposes. Capacitor 160 blocks dc current from the lamps, connections 161 provide filament voltage to the lamps, current transformer 159 serves as a means for monitoring lamp current, and auxiliary winding 163 provides a means for monitoring the voltage across the lamp string for the lamp current and voltage detect function 61.

Figure 13:
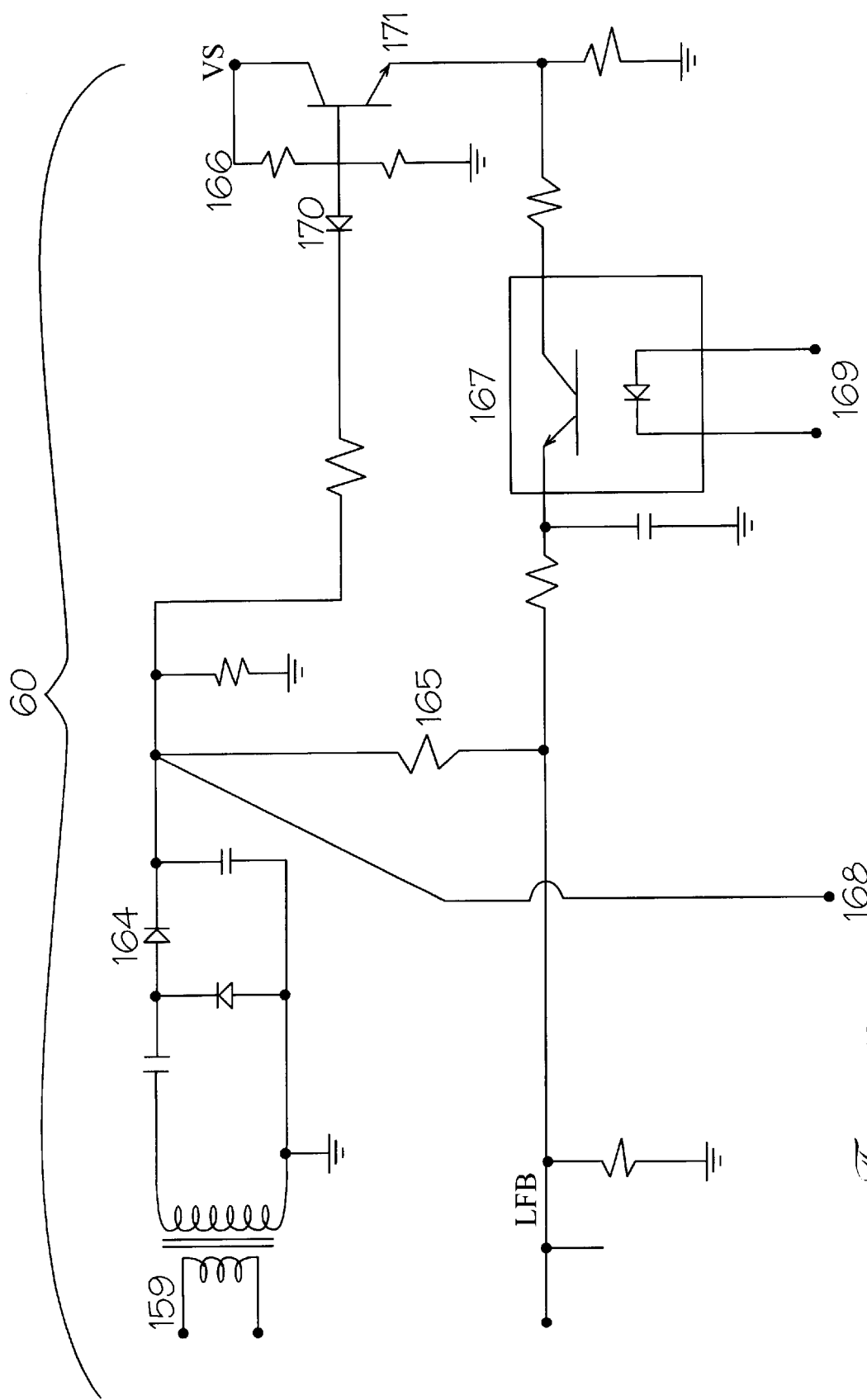
FIG. 13 illustrates the dimming control circuitry.

Referring to FIG. 13, the schematic diagram of a dimming control circuit 60. Dimming of the lamps is accomplished by raising the frequency of operation of the oscillator within the IC by increasing the voltage on IC input LFB. For stability a closed servo control loop is needed at low dimming levels, current injected into this control loop accomplishes the dimming control function. The voltage output from lamp current transformer 159 is rectified by full wave charge pump circuit 164. It is important to full wave rectify the transformer 159 output to maintain linearity of the transfer of the current signal into voltage, any dc tends to imbalance transformer 159, destroying the linearity of the current-voltage relation. At larger lamp current levels principal dimming feedback current flows through resistor 165, as diode 170 is non-conducting. External dimming control is accomplished by sending a control current from port 169 through the diode of opto-coupler 167, this can be accomplished by either a steady current of adjustable magnitude, or preferably, by a stream of digital pulses of controlled duty cycle. The average current through the transistor of opto-coupler 167 forms the external dimming control stimulus. For low dimming levels, diode 170 conducts. The feedback necessary for lamp stability is then produced by modulating the voltage division at the input to emitter follower 171. A dc voltage proportional the lamp current is obtained at port 168 and is suitable for interfacing to the micro-controller.

Figure 14:
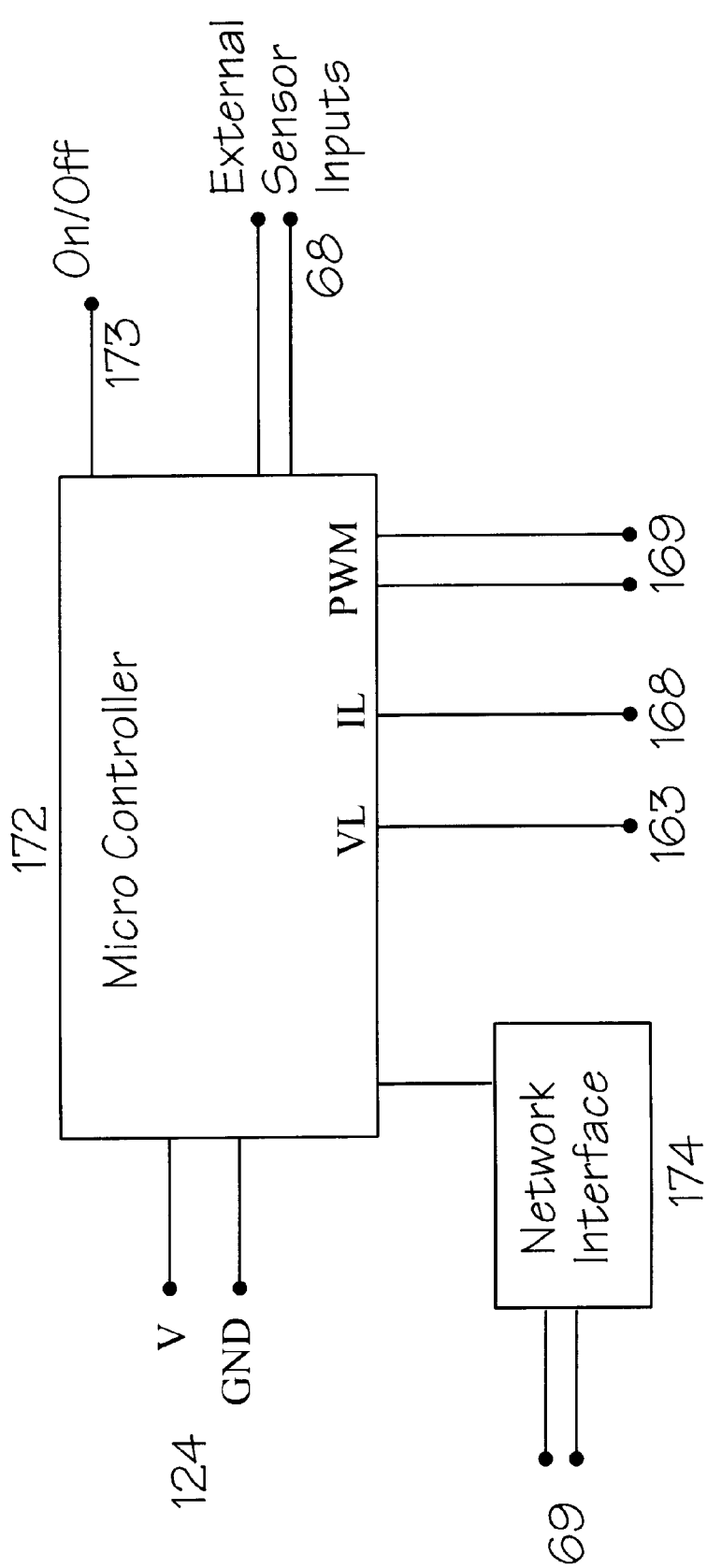
FIG. 14 illustrates an embedded micro-controller.

Referring now to FIG. 14, the embedded micro-controller. The power and ground 124 are connected to the onboard supply previously discussed. The building micro-controller network 69 is brought in via interface circuitry 174. Lamp voltage and current are sensed through analog inputs 163 and 168. Dimming control is fed to the opto-isolator located in the micro-controller 172 by the PWM pulse width modulation output 169. Ballast on/off is controlled through digital output 173, and a variety of sensors, both analog and digital are connected at 68.

Figure 15:
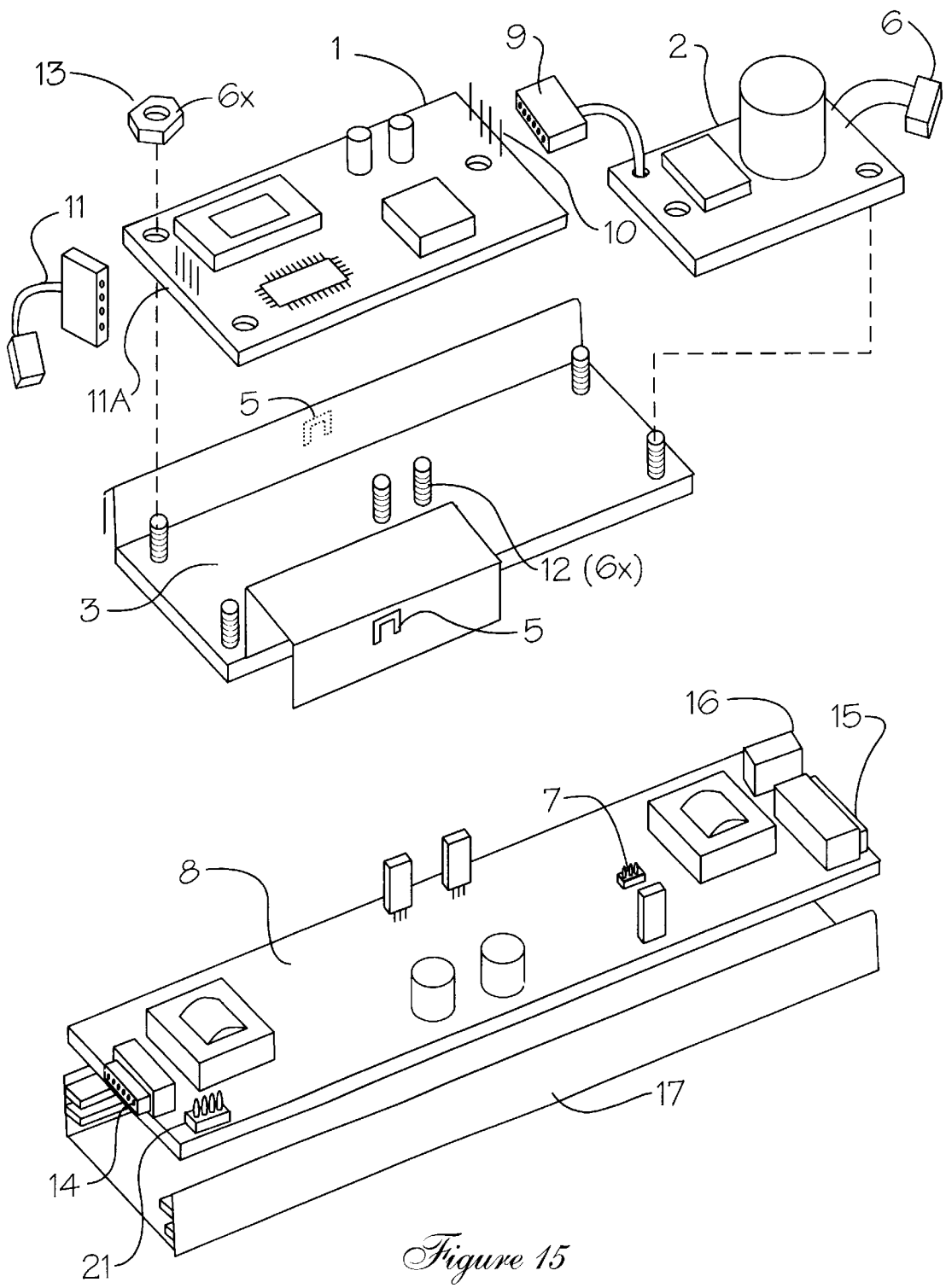
FIGS. 15 and 16 illustrates the mechanical packaging of FIG. 1.
Figure 16:
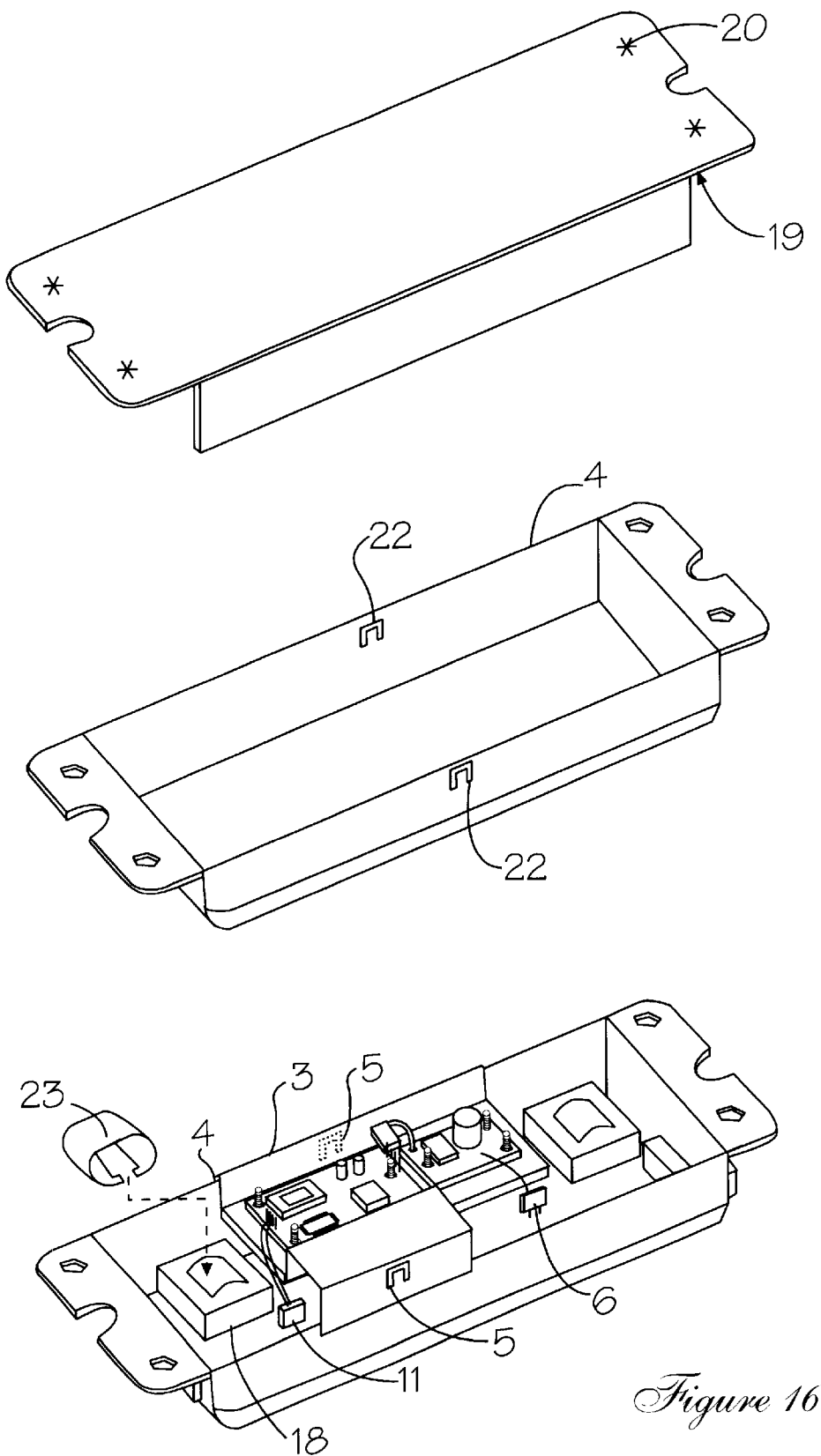

Referring now to FIG. 15 shows the mechanical packaging aspects of the main embodiment. The micro controller card including power supply 1 are attached to the base ballast printed circuit board 2 using three pinned headers 3. The three pinned headers 3 do not only supply the necessary power and signals to the micro-controller, but also provides mechanical support for the micro-controller card 1. Connectors 14 and 15 are input and output terminations for electrical power and wiring to lighting fixtures. Connector 16 provides a external communication port for the micro-controller. Insulator/retention sleeve 17 (FIG. 15) is snapped over the ballast circuit board 8 to provide insulation from the board 8 and metal ballast cover 4 (FIG. 16). Two bend tab slots 22 are located in the ballast cover 4 to accept the bend tabs 5 of mounting bracket 3. At least one heat sink structure 23, is positioned on transformer 18 to provide and enhance thermal conduction path to the external ambient thermal environment. This is required as the ballast unit is not potted. The added heat conduction and lack of potting serve to enhance the long term reliability of the entire unit. After the components are all properly positioned in the ballast cover 4, the base 19 is positioned over the cover 4 and permanently attached by four self forming rivets 20.

Since other modifications and changes varied to fit particular operating requirements and environments will be apparent to those skilled in the art, this invention is not considered limited to the example chosen for purposes of this disclosure, and covers all changes and modifications which does not constitute departures from the true spirit and scope of this invention.

Having thus described the invention, what is desired to be protected by Letters Patents is presented in the subsequently appended claims.

What is claimed is:

1. An electronic ballast system for energizing a gas discharge lamp, comprising:
   a) a housing;
   b) a high-frequency, electronic ballast circuit disposed within said housing;
   c) at least one external control network to facilitate two-way communication with ballast and non-lighting assemblies; and
   d) a micro-controller system proximate said housing and operatively connected to said electronic ballast circuit, said micro-controller system being adapted to perform at least one control function in response to a command, said micro-controller system further comprising connection and interface means to facilitate two-way communication with said at least one external control network.

2. An electronic ballast assembly comprising a micro-controller system operatively connected to an electronic ballast circuit and housed in the same housing that houses said micro-controller, said micro-controller system being adapted to perform at least one control function in response to a command, said micro-controller system further comprising connection and interface means to facilitate two-way communication with at least one external control network.

3. The electronic ballast system for energizing a gas discharge lamp as recited in claim 1, wherein said micro-controller system is located external to said housing and separated therefrom by a distance no greater than 60 inches.

4. The electronic ballast assembly as recited in claim 3, further comprising command generation means responsive to a sensed condition.

5. The electronic ballast assembly as recited in claim 4, further comprising sensing means operatively connected to said built-in micro-controller system for sensing said sensed condition.

6. The electronic ballast assembly as recited in claim 5, wherein said sensing means is within said ballast and said sensed condition is at least one condition from the group of: ac power consumption, ac current, ac voltage, lamp power consumption, lamp current, lamp voltage, ballast temperature, lamp power on/off status, number of connected lamps and lamp light output level.

7. The electronic ballast as recited in claim 5, wherein said sensing means is external to said ballast and is operatively connected to said built-in micro-controller system for sensing said sensed condition.

8. The electronic ballast as recited in claim 7, wherein said external sensing means comprises at least one from the group of: light sensors, temperature sensors, humidity sensors, electric power sensors and room occupancy sensors.

9. The electronic ballast as recited in claim 8, wherein said sensed condition is at least one condition from the group of: luminaire light level, room light level, ambient light level, ballast temperature, room temperature, room humidity and room occupancy.

10. The electronic ballast assembly as recited in claim 5, wherein said command generation means is internal to said electronic ballast.

11. The electronic ballast assembly as recited in claim 5, further comprising an external control network and wherein said command originates outside of said electronic ballast, said command being applied by said external control network to said built-in micro-controller system via said connection and interface means.

12. The electronic ballast assembly as recited in claim 5, wherein said two-way communication with said at least one external control network is accomplished by an external connection comprising at least one from the group of: electrical signal cable, coaxial cable, infrared link and radio-frequency communication link, fibre optic link, carrier-current power line link.

13. The electronic ballast assembly as recited in claim 12, further comprising a unique network address and wherein said control function comprises transmitting said unique network address to said external control network.

14. An electronic ballast system comprising:
   a) a micro-controller system operatively connected to and proximate an electronic ballast circuit, said micro-controller system being adapted to perform at least one control function in response to a command;
   b) sensing means for sensing a condition and generating a sensing signal representative thereof;
   c) command-generation means operatively connected to said micro-controller system and to said sensing means, said command-generation means being adapted to generate a command in response to said sensing signal;
   d) at least one external control network to facilitate two-way communication with ballast and non-lighting assemblies; and
   e) connection and interface means operatively connected to said micro-controller system to facilitate two-way communication with said at least one external control network.

15. The electronic ballast system as recited in claim 14, wherein said sensed condition comprises an environmental condition external to said ballast.

16. The electronic ballast system as recited in claim 15, wherein said sensed condition is at least one condition from the group of: luminaire light level, ambient light level, room light level, ballast temperature, room temperature, room humidity and room occupancy.

17. The electronic ballast system as recited in claim 14, wherein said sensed condition comprises an operating parameter of said electronic ballast.

18. The electronic ballast system as recited in claim 17, wherein said operating parameter comprises at least one from the group of: ac power consumption, ac current, ac voltage, lamp power consumption, lamp current, lamp voltage, ballast temperature, lamp power on/off status, number of connected lamps and lamp light output level.

19. The electronic ballast system as recited in claim 14, wherein said ballast is adapted to provide power to a gas-discharge lamp capable of providing illumination, and wherein said control function comprises controlling the level of said illumination.

20. The electronic ballast system as recited in claim 19, wherein said controlling of the level of said illumination comprises dimming said gas-discharge lamp.

21. The electronic ballast system as recited in claim 14, wherein said control function comprises sensing an environmental condition in the vicinity of said ballast, generating a signal representative of said environmental condition, and transmitting said signal to an external control network via said connection and interface means.

22. The electronic ballast system as recited in claim 14, wherein said two-way communication with said at least one external control network is accomplished by an external connection comprising at least one from the group of: electrical signal cable, coaxial cable, infrared link, radio-frequency communication link, fibre optic link, carrier-current power line link.

23. The electronic ballast as recited in claim 21, further comprising a unique network address and wherein said control function comprises transmitting said unique network address to said external control network.

24. The electronic ballast system as recited in claim 14, further comprising a local control bus for controlling an external device operatively attached to said local control bus.

25. The electronic ballast system as recited in claim 24, wherein said external device comprises a second electronic ballast and wherein commands internally generated in said electronic ballast may be transmitted to said second electronic ballast.

26. The electronic ballast system as recited in claim 24, wherein commands received from said at least one external control network may be re-transmitted to said external device operatively connected to said local control bus.

27. An electronic ballast system for gas-discharge lamps, comprising:
 a) a high-frequency, electronic ballast circuit for selectively powering one or more fluorescent lamps;
 b) control means operatively connected to said ballast circuit for controlling said selective powering of said one or more fluorescent lamps;
 c) an external control network to facilitate two-way communication with ballast and non-lighting assemblies; and
 d) means operatively connected to said control means for facilitating two-way communications with said an external control network.

28. The electronic ballast system for gas-discharge lamps as recited in claim 27, wherein said ballast circuit controls the light output of said fluorescent lamps in response to a signal from an external control network.

29. The electronic ballast system for gas-discharge lamps as recited in claim 28, wherein said signal from said external control network further comprises data, and wherein said light output is modulated in response to said data.

30. The electronic ballast system for energizing a gas discharge lamp as recited in claim 1, wherein said microcontroller system is disposed inside said housing.

31. The electronic ballast system for energizing a gas discharge lamp as recited in claim 1, wherein said microcontroller system is affixed externally to said housing.

* * * * *